Nov. 10, 1970 MASAO KAWASHIMA ET AL 3,540,034

CODE CONVERSION SYSTEM FOR CONVERTING ANALOG INPUT SIGNALS TO TRINARY CODE OUTPUT SIGNALS

Filed May 17, 1967 6 Sheets-Sheet 4

United States Patent Office 3,540,034

Patented Nov. 10, 1970

3,540,034

CODE CONVERSION SYSTEM FOR CONVERTING ANALOG INPUT SIGNALS TO TRINARY CODE OUTPUT SIGNALS

Masao Kawashima and Shunroku Sasaki, Yokohama-shi, and Shyoichi Kurita, Kawasaki-shi, Japan, assignors to Fujitsu Limited, Kawasaki, Japan, a corporation of Japan

Filed May 17, 1967, Ser. No. 639,144
Claims priority, application Japan, May 18, 1966, 41/31,925
Int. Cl. H03k *13/17*
U.S. Cl. 340—347 4 Claims

ABSTRACT OF THE DISCLOSURE

A code conversion system converts analog input signals to multinary code output signals. Each of a plurality of stages comprises a comparator for determining the polarity of the input signal and comparing the input signal with reference signals. The comparator provides a multinary code output signal in accordance with the polarity and comparison. An amplitude divider divides the input signal in amplitude in a determined manner into a determined number of divided portions of equal amplitude and positions the divided portions of the input signal adjacent each other to lengthen the time duration of the divided portions. An amplifier amplifies the output signal of the amplitude divider a number of times equal to the determined number of divided portions. The output of the amplifier of each stage is supplied to the input of the next succeeding stage.

DESCRIPTION OF THE INVENTION

The present invention relates to an analog code conversion system. More particularly, the invention relates to a code conversion system for converting analog signals to binary, trinary, quadrinary or other multinary code. The code conversion system of the present invention may be utilized in a pulse code modulation or PCM communication system and is an extension of the propagation type coding system heretofore utilized as a binary encoder.

Known binary coding systems include the counter type, the parallel comparison type, the feedback comparison type and the propagation type. Each of these types of coding systems has disadvantages which prevent it from attaining high speed and high precision. In order to convert analog signals in a frequency band of 5 megacycles per second in a television system to a ten place or ten digit binary code, the interval between the amplitude modulated pulse signals or PAM signals should be 100 nanoseconds and the precision of encoding should be about 0.1% of the maximum amplitude.

In the counter type binary coding system, the repetition frequency of the counting pulse becomes extremely high and reaches about 10,000 megacycles per second. This is a very difficult frequency to realize. In the parallel comparison type binary coding system, as many as about 1000 comparator units are required for high precision. This makes the system very expensive. In the feedback comparison type binary coding system, the time required for the circulation of the loop must be very short, so that the local decoder must operate at very high speed and rest condition must be reached in about a nanosecond. It is very difficult to operate at such high speed.

A propagation type binary coding system is disclosed in my copending patent application Ser. No. 550,691, filed May 17, 1966. The system described in said copending patent application comprises a comparator for an $n$ place binary code, $(n-1)$ full wave rectifiers and $(n-1)$ amplifiers and operates at the same speed as the repetitive frequency of the PAM signal or sample pulse. These advantages make the propagation type binary coding system preferable to the binary coding systems of other type.

A disadvantage of the known propagation type binary coding system is that the transient waveform of the signal transferred from one stage to the next becomes extremely complicated, due to the non-linearity of the amplitude dividing circuit. This limits considerably the places of the code, the speed of operation and the precision of operation, when several stages are utilized in cascade connection, as described, for example, in the Bell System Technical Journal of November 1965, volume 44, No. 9, page 1913. The overlapping of transient waveforms occurring in $(n-1)$ full wave rectifiers and their corresponding amplifiers is greater in code places of lower degree and time is required for the waveform to converge to its rest condition. The error in comparison thus increases and the speed of operation decreases. Known coding systems are thus limited in speed and precision of operation.

The principal object of the present invention is to provide a new and improved analog code conversion system. The code conversion system of the present invention operates at high speed and at high precision. The code conversion system of the present invention overcomes the disadvantages of the known coding systems. The code conversion system of the present invention is inexpensive in manufacture and operation. The code conversion system of the present invention is of propagation, amplitude dividing type. The propagation, amplification dividing type conversion system of the present invention provides a multinary code and utilides fewer amplitude dividing stages with non-linear characteristics than known binary coding systems, so that it avoids adverse effects of the transient waveform, operates at high speed and high precision and is inexpensive in manufacture. Thus, for example, in order to encode to about 1/2000 of maximum amplitude, a known binary propagation type encoder requires a number of stages equivalent to 11 code places, whereas the trinary encoder of the present invention requires a number of stages equivalent to only 7 code places thereby operating at high speed and high precision. The code conversion system of the present invention provides binary, trinary, quadrinary, quinary, or other multinary code.

In accordance with the invention, a code conversion system for converting analog input signals to multinary code output signals comprises a plurality of stages. Each of the stages comprises an input for supplying an analog input signal to the first of the stages and for supplying the output signal of the next preceding one of the stages as an input signal to each of the following stages. A reference source provides reference signals. A comparator determines the polarity of the input signal and compares the input signal with the reference signals. The comparator has an output for providing a multinary code output signal in accordance with the polarity and comparison. The comparator has an input connected to the input and inputs connected to the reference source. An amplitude divider divides the input signal in amplitude in a determined manner into a determined number of divided portions of equal amplitude and positions the divided portions of the input signal adjacent each other to lengthen the time duration of the divided portions. The amplitude divider has an input connected to the input and an output. An output provides the output signal of each of the stages but the last. An amplifier amplifies the output signal of the amplitude divider a number of times equal to the determined number of divided portions. The amplifier has an input connected to the output of the amplitude divider and an output connected to the output.

A code conversion system in the output of the comparator of each of the stages provides a signal representing a corresponding digit of the multinary code and there are as many stages as there are digits in the multinary code.

If the multinary code is a trinary code, the amplitude divider divides the input signal in amplitude in a determined manner into three divided portions of equal amplitude and the output of the comparator of each of the stages provides a signal representing a corresponding digit of the trinary code.

In accordance with the present invention, a method for converting analog input signals to multinary code output signals in a plurality of stages comprises the steps of comparing in each stage an input signal with reference signals, determining the polarity of the input signal to each stgae, providing a multinary code output signal in accordance with the polarity and comparison in each stage, dividing the input signal in each stage in amplitude into a determined number of divided portions of equal amplitude, positioning the divided portions of the input signal adjacent each other to length the time duration of the divided portions, and providing an output at each stage except the last for the next succeeding stage, each output comprising the positioned divided portions of the input signal of the next preceding stage. Each of the stages provides a signal representing a corresponding digit of the multinary code and as many stages are utilized as there are digits in the multinary code.

In order that the present invention may be readily carried into effect, it will now be described with reference to the accompanying drawings, wherein.

Figure 5A:
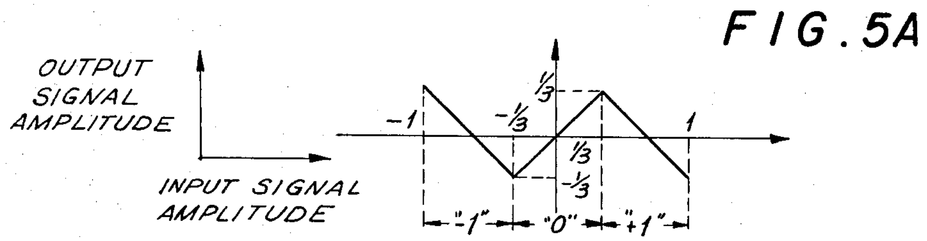
Figure 5B:
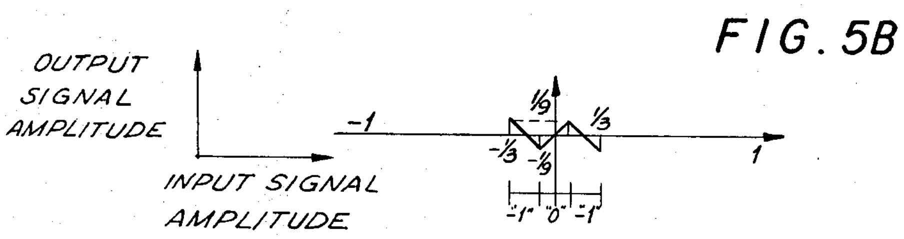
Figure 5C:
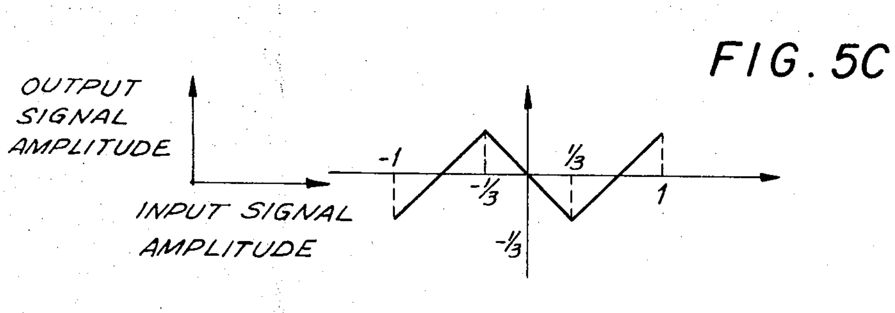
Figure 6:
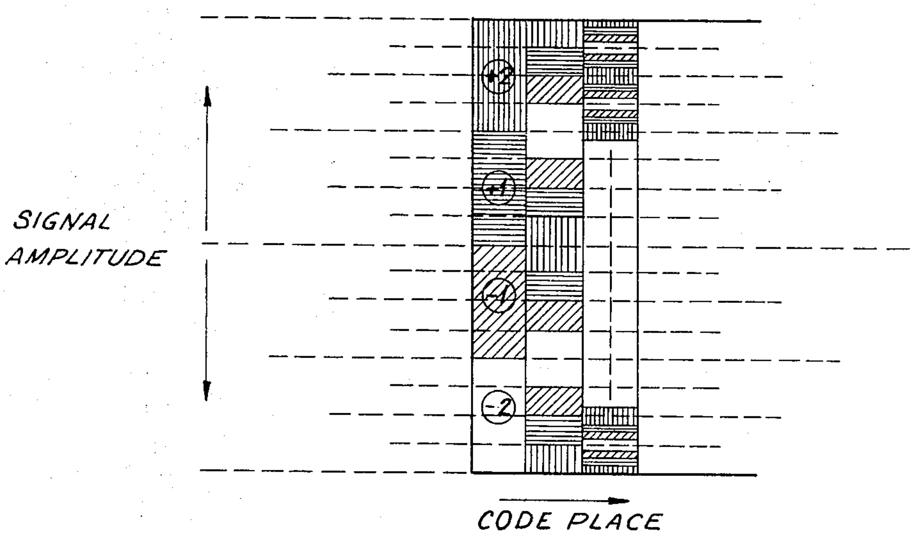
Figure 7A:
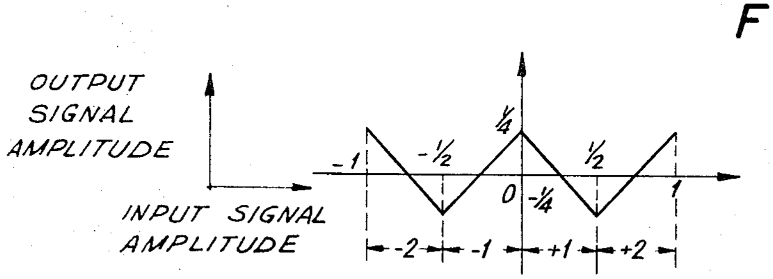
Figure 7B:
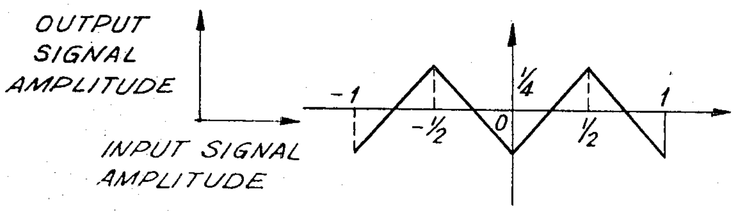
Figure 8:
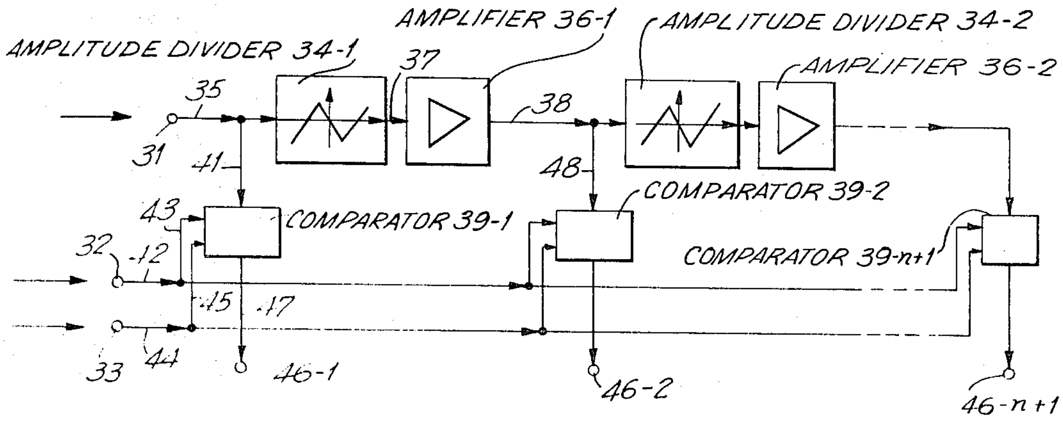
Figure 12:
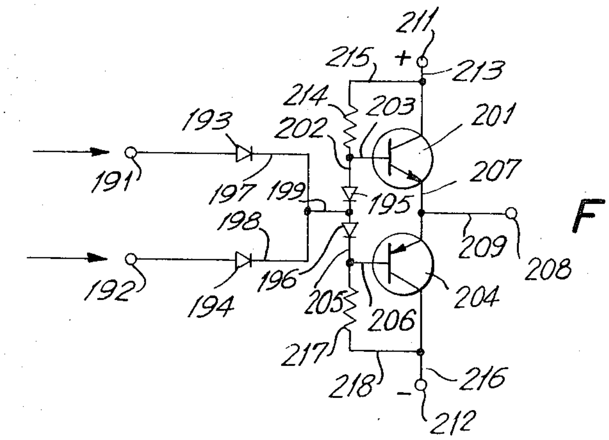
Figure 13:
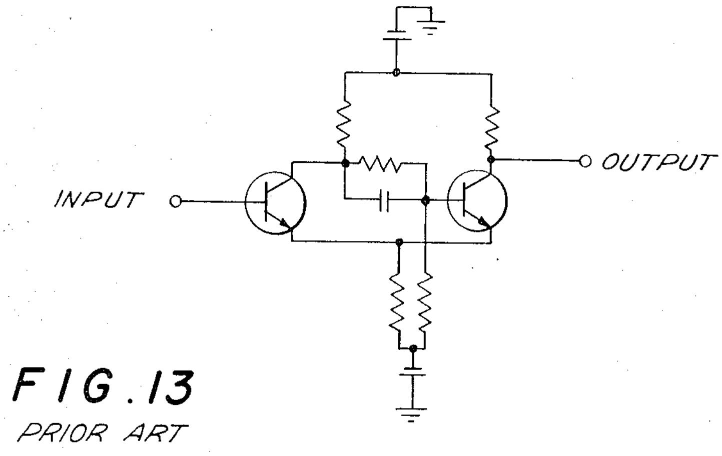
FIG. 13 PRIOR ART
Figure 9:
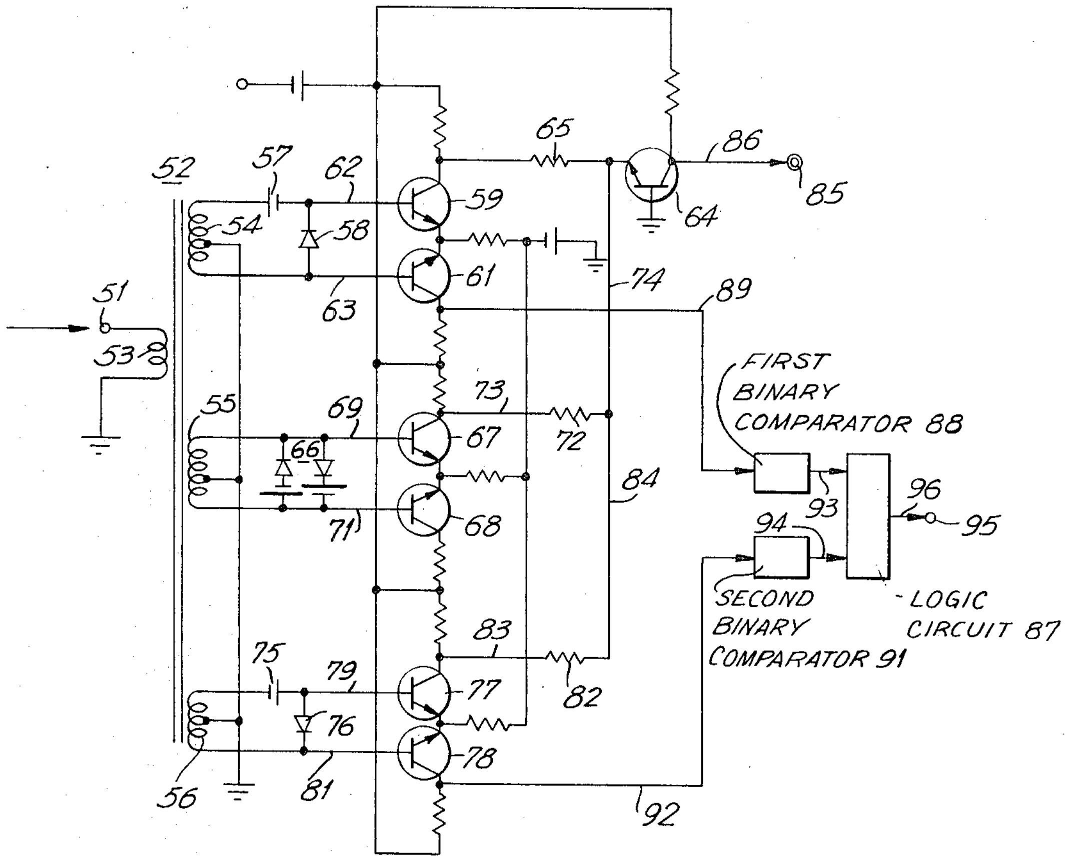
Figure 10:
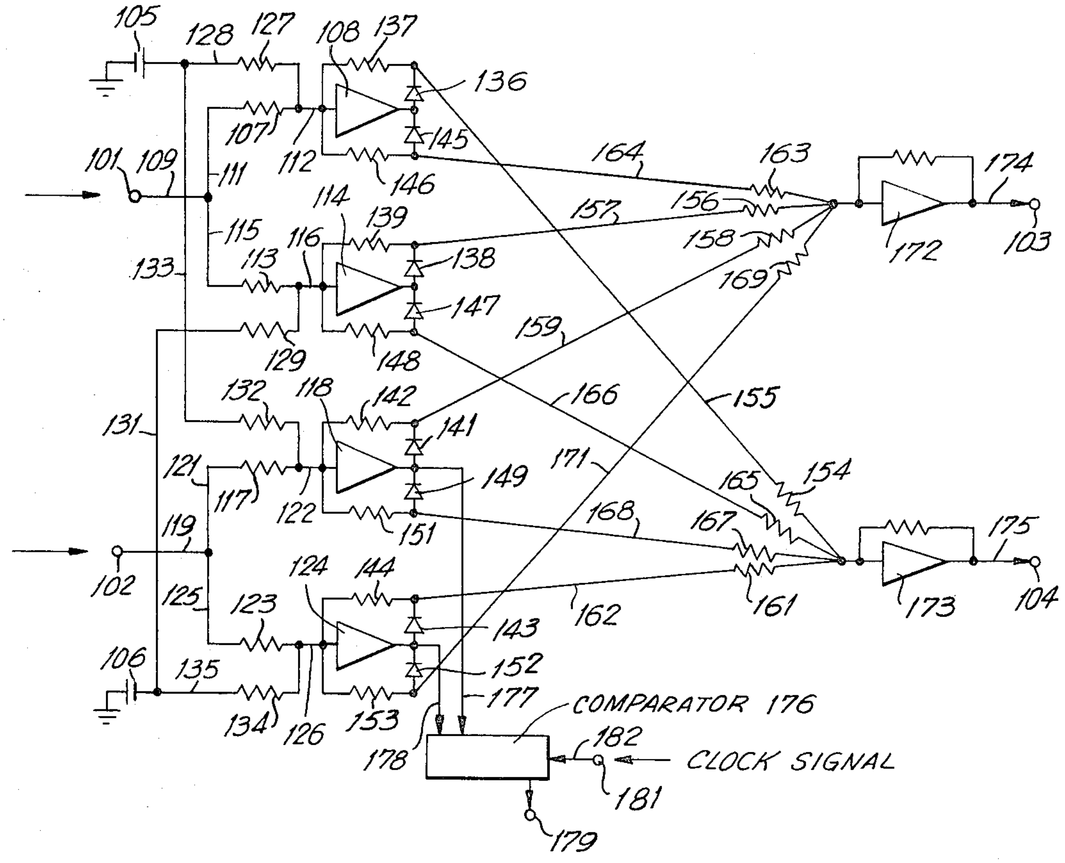
Figure 11:
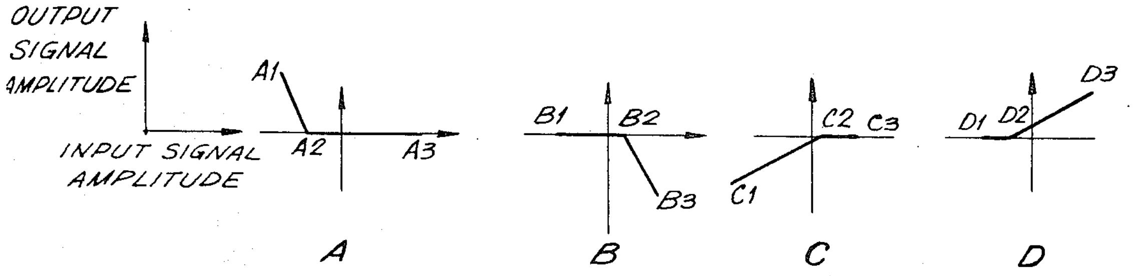

FIGS. 5A, 5B, and 5C are schematic diagrams illustrating the derivation of the trinary code by the code conversion system of the present invention;

FIG. 6 is a schematic diagram illustrating the quadrinary code provided by another embodiment of the code conversion system of the present invention;

FIGS. 7A and 7B are schematic diagrams illustrating the derivation of the quadrinary code by the code conversion system of the present invention;

FIG. 8 is a block diagram of an embodiment of the trinary code conversion system of the present invention;

FIG. 9 is a circuit diagram of the amplitude divider of the trinary code conversion system of the present invention;

FIG. 10 is a circuit diagram of a single stage of the trinary code conversion system of the present invention;

FIG. 11 is a series of graphical presentations illustrating the operation of the circuit of FIG. 10;

FIG. 12 is a circuit diagram of a code converter for converting the trinary code provided by the circuit arrangement of FIG. 10; and FIG. 13 is a circuit diagram of a Schmitt trigger circuit utilized in the circuit of FIG. 9.

Figure 1:
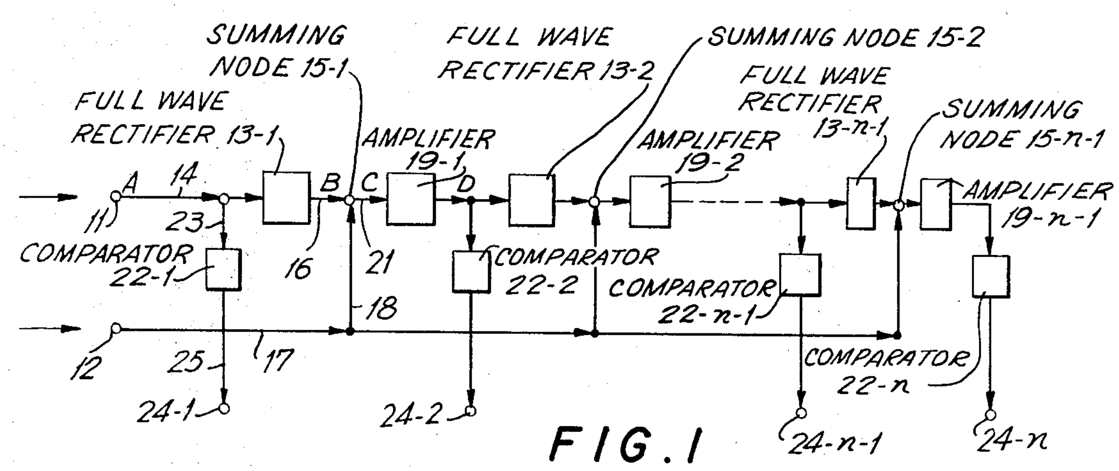
FIG. 1 PRIOR ART
FIG. 1 is a block diagram of an embodiment of a known propagation, amplitude dividing type of binary encoder.
Figure 2:
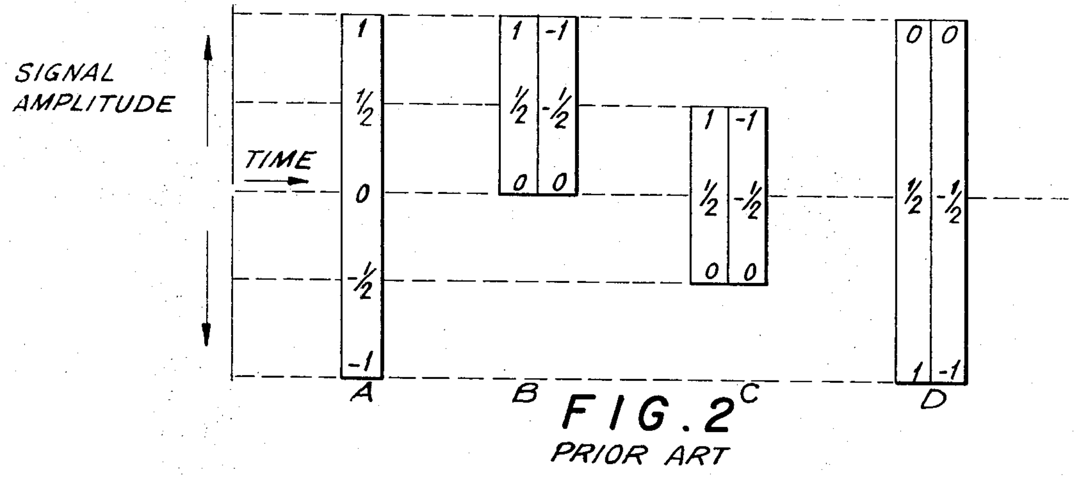
FIG. 2 PRIOR ART
FIG. 2 is a schematic diagram explaining the operation of the embodiment of FIG. 1.
Figure 3:
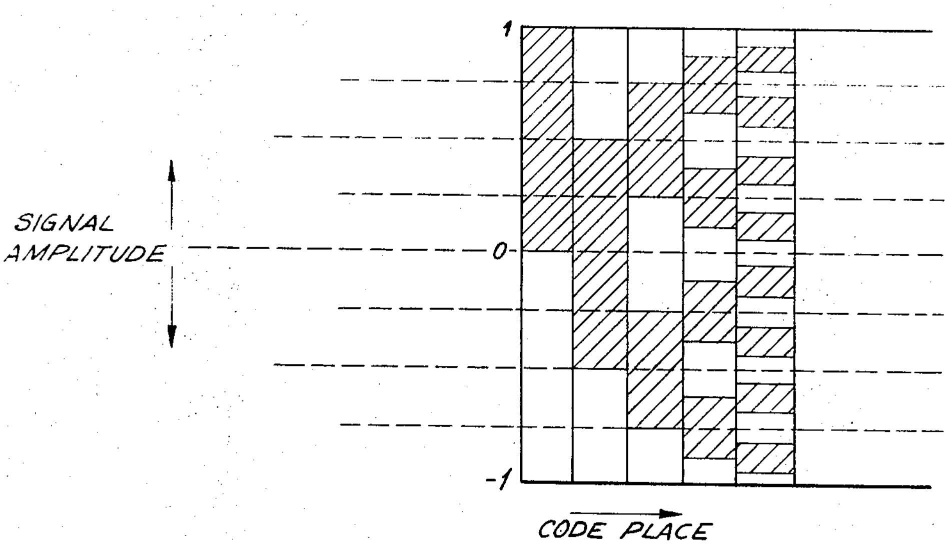
FIG. 3 PRIOR ART
FIG. 3 is a schematic diagram illustrating the binary code provided by the embodiment of FIG. 1.

FIGS. 1, 2 and 3 relate to a known propagation, amplitude dividing type of binary encoder or code conversion system which provides a binary code of $n$ places or digits. In FIG. 1, a sample signal is supplied to a first input terminal 11 and a bias voltage or current is applied to a second input terminal 12. The sample signal supplied to the first input terminal 11 is supplied to the input of a full wave rectifier 13–1 via a lead 14.

The output of the full wave rectifier 13–1 is connected to the first input of a summing node 15–1 via a lead 16. The bias signal applied to the second input terminal 12 is applied to the second input of the summing node 15–1 via a lead 17 and a lead 18. The output of the summing node 15–1 is supplied to the input of an amplifier 19–1 via a lead 21. The amplifier 19–1 has a gain of 2 since the system operation is as a binary encoder. A comparator 22–1 has an input connected to the lead 14 via a lead 23 and an output connected to an output terminal 24–1 via a lead 25.

The full wave rectifier 13–1, the summing node 15–1, the amplifier 19–1 and the comparator 22–1 comprise the first stage of the binary encoder of FIG. 1. The second stage comprises the same components 13–2, 15–2, 19–2 and 22–2 connected in the same manner. The $(n-1)$th stage comprises the same components 13–$n$–1, 15–$n$–1, 19–$n$–1 and 22–$n$–1 connected in the same manner. The $n$th stage (not shown in FIG. 1) comprises the same components connected in the same manner. Only the comparator 22$n$ of the $n$th stage is shown in FIG. 1.

In FIG. 2, the abscissa represents time and the ordinate represents signal amplitude. The signal amplitudes indicated by the ordinate are standard and extend from $+1$ to $-1$. Part A of FIG. 2 illustrates the sample signal supplied to the first input terminal 11 of FIG. 1. The amplitudes $-1$, $-½$, 0, ½ and 1 are indicated in part A in order to enhance the description of the operation of the binary encoder. After the sample signal passes through the full wave rectifier, such as the rectifier 13–1 of FIG. 1, its amplitude is divided in half and both halves are positioned adjacent each other to lengthen the duration of the signal, as shown in part B of FIG. 2. Thus, by rectifying the sample signal, the full wave rectifier effectively divides the amplitude thereof in half.

If the bias signal applied to the second input terminal 12 then biases the output signal of the full wave rectifier by $-½$, the resultant signal, which is provided by the summing node, such as the summing node 15–1 of FIG. 1, is as shown in part C of FIG. 2. The signal shown in part C differs from the signal shown in part B merely by the displacement of the signal in part C by one-half its amplitude in a negative direction. The signal provided by the summing node is then inverted and amplified two times by an amplifier, such as the amplifier 19–1 of FIG. 1. The inversion and amplification provides the signal illustrated in part D of FIG. 2. The signal of part D thus differs from the signal of part C by having twice the amplitude thereof and the opposite polartiy.

FIG. 3 is a combination graphic-tabular presentation of the binary code provided by the binary code conversion system of FIG. 1. The columns extending in the direction of the ordinate in FIG. 3 represent the first five places or digits of the binary code provided by the binary encoder of FIG. 1. In FIG. 3, each slant-hatched portion represents "1" and each blank portion represents "0." Thus, when the sample signal, which is an analog signal, is supplied to the first input terminal 11 of FIG. 1, the polarity of said sample signal is determined by the first comparator 22–1. If the comparator 22–1 determines that the sample signal is of positive polarity, a positive pulse or "1" signal is provided at the first output terminal 24–1 as the first place of the binary code to which the analog sample signal is converted. If the sample signal supplied to the first input terminal 11 of FIG. 1 is of negative polarity, no pulse or "0" signal is provided at the first output terminal 24–1 as the first place or digit of the binary code to which the analog sample signal is converted.

After the sample signal is rectified in the full wave rectifier 13–1, it is divided in two in amplitude and its two half amplitudes are positioned adjacent each other in time, in the direction of the abscissa, so that the duration of the signal is then doubled, as indicated in part B of FIG. 2. The summing node 15–1 then shifts the signal of part B by one-half its amplitude in a negative direction under the control of the bias signal applied to the second input terminal 12 of FIG. 1, as hereinabove described. The signal provided by the summing node 15–1 is then inverted and amplified two times by the amplifier 19–1, so that the output signal of said amplifier is as indicated in part D, as hereinbefore described. The second comparator 22–2 then determines the polarity of the output signal of the amplifier 19–1 (part D of FIG. 2) and provides at the second output terminal 24–2 the binary code for the second place or digit.

The aforedescribed operation of rectification, bias summation, amplification two times and determination of the polartiy of the output signal of the amplifier is repeated $n$ times and the binary code for each successive place or digit is provided at the successive output terminals 24–3, 24–4, 24–5 (not shown in FIG. 1), and so on, and output terminals 24–$n$–1, and 24–$n$. The binary code provided by the binary encoder of FIG. 1 is thus that shown in FIG. 3, having $n$ places or digits. Theoretically, the binary code outputs from the output terminals 24–1 to 24–$n$ of FIG. 1 should be provided simultaneously. In actuality, however, the places or digits of lower degree are provided later than those of higher degree due to delays in the amplifiers of each of the stages. It is thus necessary to add a suitable delay circuit to the output terminal corresponding to each place or digit of the binary code and said binary code is then derived in parallel or in series. This creates the disadvantage hereinbefore mentioned of the transient waveform becoming extremely complicated in its transfer from one stage to the next. This is due to the nonlinearity of the rectifier or amplitude divider circuit. The number of places or digits is considerable and the speed of operation and the precision of operation are considerably limited, when the large number of stages are connected in cascade, as hereinbefore mentioned.

Figure 4:
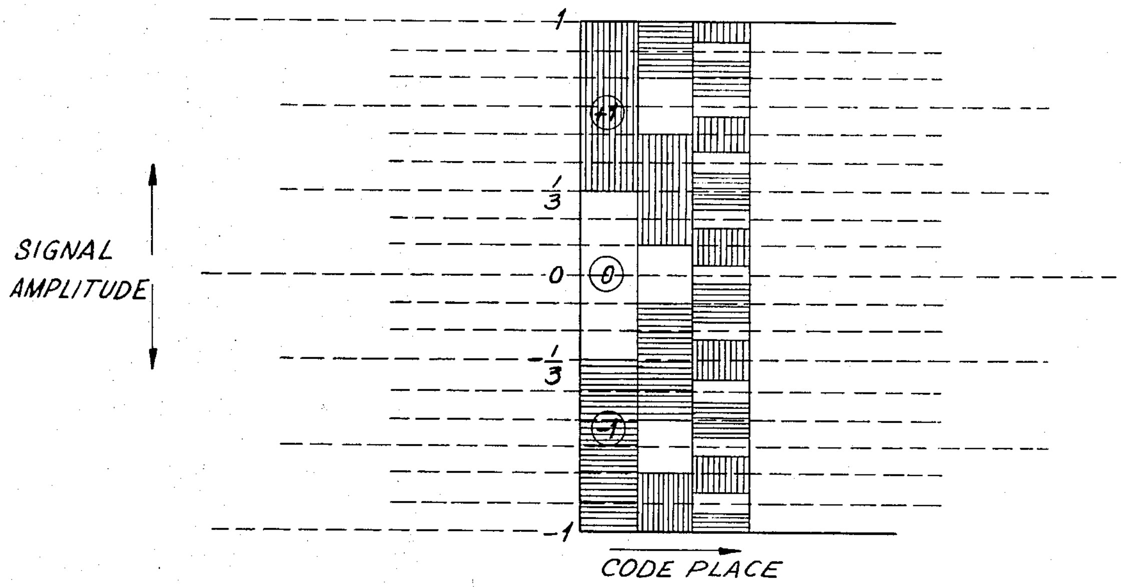
FIG. 4 is a schematic diagram illustrating the trinary code provided by an embodiment of the code conversion system of the present invention.

FIG. 4 illustrates the trinary or ternary code provided by the code conversion system of the present invention. In FIG. 4, the ordinate represents the amplitudes of the signals standardized within a range of +1 to −1 and the abscissa represents the places or diigts of the trinary code. Three code places or digits are shown in FIG. 4. In FIG. 4, hatching in the direction of the ordinate indicates a +1 signal, hatching in the direction of the abscissa indicates a −1 signal and a blank portion indicates a 0 signal.

As indicated in FIG. 4, the first place or first digit, on the left, of the output trinary code is a +1 signal if the standardized bipolar input signal amplitude is greater than +⅓ and is −1 if said amplitude is less than −⅓ or greater than ⅓ in the negative direction. The first place or first digit of the output trinary or ternary code is 0 if the standardized bipolar input signal amplitude is less than +⅓ or greater than −⅓ or less than ⅓ in the negative direction.

The second place or digit of the output ternary code provides three times as many variations as the first place, so that the range of variations of signals from +⅓ to +1 of the second place is the same as the variations from +1 to −1 of the first place, and this is also true for −⅓ to +⅓ of the second place and −⅓ to −1 of the second place. The amplitude range from +⅑ to +5/9 of the second place is symmetrical about the amplitude +⅓ of the first place and the amplitude range from −⅑ to −5/9 of the second place is symmetrical about the amplitude −⅓ of the first place. Thus, if the amplitude is divided at the levels +⅓ and −⅓ of the first place and the three divided portions are positioned inverted in adjacent relation to each other in the direction of the abscissa so that the duration of the signal is tripled, the +1 level and the −⅓ level will be the same and the −1 level and the +⅓ level will be the same.

The trinary code for the second place over the entire amplitude range may thus be determined by determining the code in the amplitude range of +⅓ to −⅓ by a comparison of $(⅓)^2$ and $(-⅓)^2$. Similarly, for the third place or third digit of the trinary code, in the amplitude range of +⅓ to −⅓, the amplitude is divided at the amplitude levels +⅑ and −⅑ and the code for the entire amplitude range may be determined by the comparison of $(⅓)^2$ and $(-⅓)^2$ within the amplitude range of +⅓ to −⅓. The division and positioning of the divided out parts adjacent each other to lengthen the signal duration is then successively repeated for each code place or digit and the output trinary code is thus determined from the amplitudes and polarities.

The dividing, quotient or input-output characteristic of the trinary code is illustrated in FIG. 5. In each of parts A, B and C of FIG. 5, the abscissa represents the input signal amplitude and the ordinate represents the output signal amplitude. Part A of FIG. 5 illustrates the amplitude dividing or quotient characteristic for the second place and part B of FIG. 5 illustrates the dividing or quotient characteristic of the third place or digit of the trinary code. The amplitude range in each case is successively divided into thirds. However, if an amplifier is provided for each place or digit of the code, so that the amplitude is tripled, a signal of the same amplitude range may be consistently utilized. The trinary or ternary code may thus be provided by a circuit which provides the input-output characteristic indicated by Part A of FIG. 5.

The dividing or quotient characteristic of part C of FIG. 5 may be utilized to provide the second place or second digit of the trinary code. If the part C input-output characteristic is utilized, the signal levels +1 and −1 of the second place shown in FIG. 4 are interchanged. The operation utilizing the characteristic of part C is the same as that utilizing the characteristic of part A, except for the interchange in each even-numbered place or digit of the trinary code of +1 and −1.

It is thus seen, in considering part A of FIG. 5, for example, that the amplitude of the input-output characteristic varies in a linear sawtooth function at 45° slope. The input signal amplitude thus varies from −1 to −⅓ to produce an output signal amplitude which varies from +⅓ to −⅓; the output signal having a trinary code value of −1. The input signal amplitude then varies from −⅓ to +⅓ to produce an output signal amplitude of −⅓ to +⅓; the output signal amplitude being 0. The input signal amplitude then varies from +⅓ to +1 to produce an output signal amplitude which varies from +⅓ to −⅓; the output signal being +1. In the −1 output signal range, the characteristic has a negative slope at 45°, as it does in the +1 output signal range. In the 0 output signal range, the characteristic has a positive slope of 45°.

In the manner described for the provision of a trinary or ternary code by the code conversion system of the present invention, a quadrinary, quinary or any other multinary code may be provided. Thus, as an example, a quadrinary code which may be provided by the code conversion system of the present invention, is illustrated in FIG. 6 and the dividing, quotient or input-output characteristics are illustrated in parts A and B of FIG. 7. Thus, a circuit which provides the dividing or quotient characteristic of part A of FIG. 7 or the dividing or quotient characteristic of part B of FIG. 7 may be utilized to provide the quadrinary code shown in three places or digits in FIG. 6. Such a circuit comprises a comparator for detecting the quadrinary code and an amplifier which has a gain of four.

In FIG. 6, the ordinate represents the signal amplitude and the abscissa represents the code place. Hatching in the direction of the ordinate indicates a signal amplitude of +2, hatching in the direction of the abscissa indicates a signal amplitude of +1, slant-hatching indicates a signal amplitude of −1 and a blank portion indicates a signal amplitude of −2. In parts A and B of FIG. 7, the abscissa represents the input signal amplitude and the ordinate represents the output signal amplitude after division. If the input-output characteristic of part B of FIG. 7 is utilized instead of the input-output characteristic of par A of FIG. 7, the operation is the same for both characteristics except that +2 and −2 as well as +1 and −1 are interchanged wherever they appear when the characteristic of part B is utilized rather than the characteristic of part A.

In part A of FIG. 7 for example, the dividing, quotient or input-output characteristic is thus a linear sawtooth function. When the input signal amplitude is in the range of −1 to −½, it provides an output signal amplitude of +¼ to −¼; the quadrinary code signal is then −2. When the input signal amplitude is in the range of −½ to 0, it provides an output signal amplitude of −¼ to +¼; the quadrinary output signal is then −1. When the input signal amplitude varies in range from 0 to +½, it provides an output signal amplitude which varies from +¼ to −¼; the quadrinary output signal being +1. When the input signal amplitude varies from +½ to +1, it provides an output signal amplitude which varies from −¼ to +¼; the quadrinary output signal being +2. In the −2 and +1 quadrinary code signal ranges, the characteristic has a negative slope of less than 45°. In the −1 and +2 quadrinary code signal ranges, the characteristic has a positive slope, equal to the negative slope, of less than 45°.

The code conversion system or encoder of the present invention for providing a trinary or ternary code having $n+1$ places or digits is shown in FIG. 8. In FIG. 8, an amplitude modulation pulse signal to be encoded is supplied to a first input terminal 31. Two reference signals, which may be voltages or currents, are applied via second and third input terminals 32 and 33, respectively, to the circuit. The signal to be encoded is supplied from the first input terminal 31 to the input of an amplitude divider 34–1 of a type which provides the dividing, quotient or input-output characteristics illustrated in FIG. 5 via a lead 35. The output of the amplitude divider 34–1 is supplied to the input of an amplifier 36–1 via a lead 37. The amplifier 36–1 has a gain of three. The output of the amplifier 36–1 is provided at the output of the first stage via a lead 38.

The signal to be encoded is supplied to a first input of a comparator 39–1 via a lead 41. The first reference signal is supplied via leads 42 and 43 to a second input of the comparator 39–1. The second reference signal is supplied to a third input of the comparator 39–1 via leads 44 and 45. The output of the comparator 39–1 is provided at an output terminal 46–1 via a lead 47.

The amplitude divider 34–1, the amplifier 36–1 and the comparator 39–1 comprise the first stage of the code conversion system of FIG. 8. The first stage provides the first place or first digit of the output trinary code. The first stage is followed by $n$ stages each the same as the first stage. Each successive stage produces the next succeeding place or digit of the output trinary code. Thus, for example, the second stage, as shown, comprises an amplitude divider 34–2, an amplifier 36–2 and a comparator 39–2, interconnected in the same manner as in the first stage. The components of the last stage, of which only the comparator is shown, are an amplitude divider 34–$n$+1, an amplifier 36–$n$+1 and a comparator 39–$n$+1, connected as illustrated in the first and second stages of FIG. 8. The trinary output signal places or digits are provided at the different output terminals 46–1, 46–2, and so on, through 46–$n$+1.

The amplitude modulation pulse signal to be encoded is supplied to the comparator 39–1 via the first input terminal 31 and the leads 39 and 41 and is compared with the two reference signals supplied to said comparator via the second and third input terminals 32 and 33 by said comparator. The result of the comparison, which determines the polarity and amplitude of the signal to be encoded, is provided at the output terminal 46–1 as the trinary code output signal "+1." The signal provided at the first output terminal 46–1 is thus the first place or first digit of the output trinary code.

The signal to be encoded is also supplied to the amplitude divider 34–1 via the first input terminal 31 and the lead 35. The amplitude divider 34–1 functions to produce an output signal having an amplitude which varies relative to the amplitude of the signal to be encoded by the characteristic of part A of FIG. 5. The output signal produced by the amplitude divider 34–1 is then amplified by the amplifier 36–1. Since the amplifier 36–1 has a gain of three, the output of said amplifier has an amplitude which is three times the output signal produced by the amplitude divider 34–1. The output signal of the amplifier 36–1 is supplied to the input of the amplitude divider 34–2 of the second stage via the lead 38 and is also supplied to the comparator 39–2 of said second stage via the lead 38 and a lead 48.

The aforedescribed process is then repeated in each of the next succeeding, but not shown, stages of the code conversion system of FIG. 8 and the complete trinary code output is provided as soon as the $(n+1)$th place signal is provided at the output terminal 46–$n$+1. The trinary code signals provided at the output terminals 46–1 to 46–$n$+1 have different time delays, which are, however, made uniform by the circuitry utilized, and the trinary code signals are thus provided in $n+1$ parallel or series places.

FIG. 9 discloses an amplitude divider which may be utilized as the amplitude divider 34–1 of FIG. 8 and which may be utilized as each of the succeeding amplitude dividers of FIG. 8. The input signal of the amplitude divider is supplied to an input terminal 51 and is distributed to the amplitude divider circuit via an input transformer 52. The input transformer 52 has a grounded input or primary winding 53 to which the input signal is supplied via the input terminal 51 and three output or secondary windings 54, 55 and 56.

A negative bias voltage is provided by a suitable power source such as, for example, a battery 57, connected to one end of the output winding 54 of the transformer 52. A rectifier 58 is connected across the series connection of the transformer winding 54 and the battery 57. A first differential amplifier comprising a pair of transistors 59 and 61, in common emitter connection, is connected across the rectifier 58. The first differential amplifier 59, 61 amplifies the output of the rectifier 58. The base electrode of the transistor 59 is connected to the cathode of the rectifier 58 via a lead 62 and the base electrode of the transistor 61 is connected to the anode of said rectifier via a lead 63. The collector electrode of the transistor 59 is connected to the emitter electrode of a summing transistor 64 via a first summing resistor 65.

A clamping circuit 66 is connected across the output winding 55 of the transformer 52. The clamping circuit 66 may comprise any suitable clamping arrangement such as, for example, a pair of parallel branches each having a source of bias voltage connected in series with a diode, the bias voltage source and the diode of each branch being connected with opposite polarity and direction of conduction relative to the other. A second differential amplifier comprising a pair of transistors 67 and 68, connected in common emitter configuration, is connected across the clamping circuit 66. The base electrode of the transistor 67 is connected to one output terminal of the clamping circuit 66 via a lead 69 and the base electrode of the transistor 68 is connected to the other output terminal of the clamping circuit 66 via a lead 71. A second summing resistor 72 is connected between the collector electrode of the transistor 67 and the emitter electrode of the summing transistor 64 via leads 73 and 74.

A source of positive bias voltage, which may comprise any suitable power source such as, for example, a battery 75, is connected to one end of the output winding 56 of the transformer 52. A rectifier 76 is connected across the series connection of the output winding 56 and the battery 75. A third differential amplifier comprising a pair of transistors 77 and 78, connected with their emitter electrodes in common, is connected across the rectifier 76. The base electrode of the transistor 77 is connected to the anode of the rectifier 76 via a lead 79 and the base electrode of the transistor 78 is connected to the cathode of said rectifier via a lead 81. A third summing resistor 82 is connected between the collector electrode of the transistor 77 and the emitter electrode of the summing transistor 64 via leads 83 and 84 and the lead 74.

The first and third summing resistors 65 and 82 supply signals of positive polarities to the summing transistor 64 and said summing transistor provides an input-output characteristic as shown in part A of FIG. 5 at an output terminal 85 via a lead 86 connected to the collector electrode of said summing transistor. The collector electrode of the transistor 61 of the first differential amplifier 59, 61 is connected to the first input of a logic circuit 87 via a first binary comparator 88 and a lead 89. The collector electrode of the transistor 78 of the third differential amplifier 77, 78 is connected to the second input of the logic circuit 87 via a second binary comparator 91 and a lead 92.

If the predetermined maximum amplitude of the input signal $e_i$ supplied to the input terminal 51 is $e_{max}$ and if the voltage of the battery 57 is equal to such predetermined maximum amplitude plus one-third of said input signal, said input signal applied to the base electrodes of the transistors 59 and 61 of the first differential amplifier is equal to $e_i - \frac{1}{3}e_{max}$, if $e_i$ is greater than or equal to ⅓. The input signal to the transistors 59 and 61 is zero if $e_i$ is less than one-third. Furthermore, the input signal applied to the base electrodes of the transistors 77 and 78 of the third differential amplifier 77, 78 is equal to $-e_i + \frac{1}{3}e_{max}$, if $e_i$ is less than or equal to −⅓. The input signal to the transistors 77 and 78 is zero if $e_i$ is greater than −⅓.

In FIG. 9, the clamping circuit 66 functions to clamp signals having amplitudes greater than ±⅓ to ±⅓. Each of the first and second binary comparators 88 and 91, respectively, may comprise any suitable known type of binary comparator which provides an output signal when there is a voltage across the first summing resistor 65 and across the third summing resistor 82, respectively. The second binary comparator 91 includes a known trigger circuit, shown in FIG. 13, which is preferably a Schmitt trigger circuit. The logic circuit 87 comprises any suitable logic circuit for determining which of the code signals +1, 0 and −1 is provided at the output of each of the first and second binary comparators 88 and 91. The output of the first binary comparator 88 is applied to the first input of the logic circuit 87 via a lead 93 and the output of the second binary comparator 91 is applied to the second input of the logic circuit 87 via a lead 94. The signal provided by the logic circuit 87 is applied to an output terminal 95 via a lead 96. The output terminal 95 thus provides the trinary code output produced by the circuit arrangement of FIG. 9.

When an input signal having an amplitude Z which is greater than one-third is supplied to the input terminal 51, the amplitude of the input signal is reduced by one-third by the source 57 and the signal is then rectified by the rectifier 58. The rectified signal is inverted in polarity by the transistor 59. The signal at the second summing resistor 72 is then one-third and there is no voltage produced by the third summing resistor 82 since the input signal is Z+⅓ so that it is positive. The sum of the voltages across the first and second summing resistors 65 and 72 is thus −Z−⅓)+⅓ and is therefore −Z+⅔. The resultant sum of −Z+⅔ is provided by the summing transistor 64 and is provided at the output terminal 85.

When the input signal applied to the input terminal 51 has an amplitude Z which is less than or equal to one-third, but which is greater than −⅓, there is no voltage across or signal produced by the first summing resistor 65, so that the amplitude of the signal biased by the voltage source 57 is negative and there is no signal produced by or voltage across the third summing resistor 82, because the amplitude of the signal biased by the voltage source 75 is positive. There is no limitation of the amplitude by the clamping circuit 66, and the signal is supplied to the summing transistor 64 without modification and is provided at the output terminal 85 without modification.

When the input signal applied to the input terminal 51 has an amplitude Z which is less than −⅓, there is no voltage across or signal produced by the first summing resistor 65 and the voltage across or signal produced by the second summing resistor 72 is −⅓. The voltage across or signal produced by the third summing resistor 82 is −Z+⅓), so that the resultant sum is −Z+⅓−⅓ or −Z−⅔, so that signal of −Z−⅔ is provided at the output terminal 85.

If the output signal provided by the first binary comparator 88 is 093 and the output signal provided by the second binary comparator 91 is 094, the trinary code signal provided by the logic circuit 87 from the output signals 093 and 094 is provided at the output terminal 95 and is indicated as 095. The relationship between the amplitude Z of the input signal applied to the input terminal 51 and the signals 093, 094 and 095 is indicated as follows. When the amplitude Z of the input signal is greater than one-third, the signal 093 is 1, the signal 094 is 0 and the signal 095 is +1. When the amplitude Z of the input signal is less than or equal to ⅓ and is greater than −⅓, the signal 093 is 0, the signal 094 is 0 and the signal 095 is 0. When the amplitude Z of the input signal is less than or equal to −⅓, the signal 093 is 0, the signal 094 is 1 and the signal 095 is −1.

FIG. 10 is a circuit diagram of one stage of the trinary code conversion system of the present invention, including the amplitude divider, the amplifier and the comparator. Parts A, B, C and D of FIG. 11 illustrates the operation of FIG. 10, and indicate the provision of the input-output characteristic of part A of FIG. 5 by the circuit arrangement of FIG. 10. In FIG. 11, parts A, B, C and D each have an abscissa indicating the input signal amplitude and an ordinate indicating the output signal amplitude.

In FIG. 10, two input signals, which are pulse amplitude modulated or PAM signals, having the same absolute amplitude but of opposite polarities, are applied to first and second input terminals 101 and 102, respectively. The circuit arrangement of FIG. 10 functions to divide and position both input signals adjacent each other so that their duration is increased after division and to amplify the signals to produce at first and second output terminals 103 and 104, respectively, two pulse amplitude modulated signals of the same absolute amplitude but of opposite polarities. The circuit arrangement of FIG. 10 is a balanced circuit and functions to considerably reduce the influence of noise and to provide high precision operation at high speed with considerable facility.

In FIG. 10, a voltage source such as, for example, a battery 105, provides a bias voltage of +1 and a voltage source such as, for example, a battery 106 provides a bias voltage of −1. A first summing resistor 107 is connected between the input terminal 101 and the input of a first amplifier 108 by leads 109, 111 and 112. A second summing resistor 113 is connected between the input terminal 101 and the input of a second amplifier 114 by the lead 109 and leads 115 and 116. A third summing resistor 117 is connected between the input terminal 102 and the input to a third amplifier 118 via leads 119, 121 and 122. A fourth summing resistor 123 is connected between the input terminal 102 and the input to a fourth amplifier 124 via the lead 119 and leads 125 and 126. Each of the first to fourth summing resistors 107, 113, 117 and 123 has a determined resistance value of, for example, R.

A fifth summing resistor 127 is connected between the first battery 105 and the input to the first amplifier 108 via a lead 128 and the lead 112. A sixth summing resistor 129 is connected between the second battery 106 and the input to the second amplifier 114 via a lead 131 and the lead 116. A seventh summing resistor 132 is connected between the first battery 105 and the input to the third amplifier 118 via a lead 113 and the lead 122. An eighth summing resistor 134 is connected between the second battery 106 and the input of the fourth amplifier 124 via a lead 135 and the lead 126. Each of the fifth to eighth summing resistors 127, 129, 132 and 134 has a resistance magnitude which is three times the determined resistance of each of the first to fourth summing resistors 107, 113, 117 and 123. The resistance value of each of the fifth to the eighth summing resistors is thus 3R.

Each of the first to fourth amplifiers 108, 114, 118 and 124 is a feedback amplifier, although the feedback paths differ in accordance with the polarity of the output signals from said amplifiers. If the output signal of the amplifier is positive, the feedback path of the first amplifier is via a first diode 136 and a first resistor 137, the feedback path of the second amplifier is through a diode 138 and a resistor 139, the feedback path of the third amplifier 118 is through a diode 141 and a resistor 142 and the feedback path of the fourth resistor is through a diode 143 and a resistor 144.

If the signal provided at the output of the amplifier is negative, the feedback path of the first amplifier 108 is through a second diode 145 and a second feedback resistor 146, the feedback path of the second amplifier 114 is through a diode 147 and a feedback resistor 148, the feedback path of the third amplifier 118 is through a diode 149 and a feedback resistor 151 and the feedback path of the fourth amplifier 124 is through a diode 152 and a feedback resistor 153.

When the output signal produced by the first amplifier is positive, such output signal is provided at a resistor 154 having a resistance value of R. When the output signal of the second amplifier is positive, such output signal is provided at a resistor 156 having a resistance magnitude of R via a lead 157. When the output signal of the third amplifier 118 is positive, it is provided at a resistor 158 via a lead 159. When the output signal of the fourth amplifier 124 is positive it is provided at a resistor 161 having a resistance magnitude R via a lead 162.

When the output signal of the first amplifier 108 is negative, it is provided at a resistor 163 via a lead 164. When the output signal of the second amplifier 114 is SH the output signal of the second amplifier 114 is negative, it is provided at a resistor 165 via a lead 166. When the output signal of the third amplifier 118 is negative, it is provided at a resistor 167 via a lead 168. When the output signal of the fourth amplifier 124 is negative, it is provided at a resistor 169 via a lead 171.

A first parallel feedback output amplifier 172 has a gain of one and its input is connected in common with each of the resistors 163, 156, 158 and 169. The first output amplifier 172 functions to provide the resultant sum of the signals provided at each of the resistors 163, 156, 158 and 169. A second parallel feedback output amplifier 173 having a gain of one has an input connected in common with each of the resistors 154, 165, 167 and 161. The second output amplifier 173 provides a resultant sum of the signals at the resistors 154, 165, 167 and 161. The resultant sum provided by the first output amplifier 172 is provided at the first output terminal 103 via a lead 174 connected to the output of said amplifier. The resultant sum provided by the second output amplifier 173 is provided at the second output terminal 104 via a lead 175 connected to the output of said second amplifier.

The output of the third amplifier 118 is connected to a first input of a comparator 176 via a lead 177. The output of the fourth amplifier 124 is connected to a second input of the comparator 176 via a lead 178. The comparator 176 functions to determine the polarities of the output signals of the third and fourth amplifiers and provides an output signal at the output terminal 179. A clock input signal is supplied to a third input of the comparator 176 via a lead 182. The clock signal determines the code detecting contact point.

The input signal $e$ supplied to the first input terminal 101 is supplied to the input of the first amplifier 108 via the first summing resistor 107. Since the voltage source 105 provides a voltage of +1, and the fifth summing resistor 127 has a resistance magnitude of 3R, the input current of the first amplifier 108 is $$e/R+1/3R=1/R)e+1/3)$$

It is assumed that the input impedance and the output impedance of the first amplifier 108 is low and the transfer impedance $-\mu$ is extremely high. Thus, if the resistance magnitude of the first feedback resistor 137 is 4.5R, the output voltage equals $-4.5\ (e+1/3)$.

Since the feedback current is rectified by the first diode 136, the output current does not flow through the resistor 154 when $e$ is greater than $-1/3$. The current $i_1$ which flows through the resistor 154 is then equal to zero if $e$ is greater than $-1/3$ and said current is equal to $-4.5(e+1/3)$ when $e$ is less than or equal to $-1/3$. This situation is illustrated in part A of FIG. 11.

The input current $i$ of the second amplifier 114 is $1/R(e-1/3)$, so that if the resistance value of the feedback resistor 148 is 4.5R, the current $i_2$ which flows through the resistor 165 is zero when $e$ is less than or equal to $1/3$ and said current is equal to $-4.5(e-1/3)$ when $e$ is greater than $1/3$. This is illustrated in part B of FIG. 11.

An input signal having the opposite polarity from that applied to the first input terminal 101 is supplied to the second input terminal 102. The input signal $-e$ supplied to the second input terminal 102 is applied to the third amplifier 118 via the third summing resistor 117. If the resistance value of the feedback resistor 151 is 1.5R, the current $i_3$ which flows through the resistor 167 is zero when $e$ is greater than $1/3$ and said current is $-1.5(-e+1/3)$ when $e$ is less than or equal to $1/3$. This is illustrated in part C of FIG. 11.

If the resistance value of the feedback resistor 144 of the fourth amplifier 124 is 1.5R, the current $i_4$ which flows through the resistor 161 is zero when $e$ is less than or equal to $-1/3$ and said current is $-1.5(-e-1/3)$ when $e$ is greater than $-1/3$. This is shown in part D of FIG. 11.

If the input signal $e$ supplied to the first input terminal 101 is greater than $1/3$, currents flow only in the resistors 165 and 161 and the sum of these currents is $i_2+i_4=-3e+2$. If the input signal $e$ is less than or equal to $1/3$ and greater than $-1/3$ currents flow to the resistors 167 and 161 and the sum of the currents $i_3$ and $i_4$ is equal to $3e$. If the input signal $e$ is less than or equal to $-1/3$ currents flow to the resistors 154 and 167 and the sum of the currents $i_1$ and $i_3$ is equal to $-3e-2$. These three situations combined into one provide a characteristic which is equivalent to the characteristics provided by extending the input-output characteristic of part A of FIG. 5 three times in the direction of the ordinate. Furthermore, if the resistance values of the feedback resistors 146 and 139 are 1.5R and the resistance values of the feedback resistors 142 and 153 are 4.5R, the currents $i'_1$, $i'_2$, $i'_3$ and $i'_4$ which flow in the resistors 163, 156, 158 and 169, respectively, are as follows. The current $i'_1$ is equal to zero when $e$ is less than or equal to $-1/3$ and said current is equal to $-1.5(e+1/3)$ when $e$ is greater than $-1/3$. The current $i'_2$ is equal to zero when $e$ is greater than $1/3$ and said current is equal to $-1.5(e-1/3)$ when $e$ is less than or equal to $-1/3$. The current $i'_3$ is equal to zero when $e$ is less than or equal to 1/3 and said current is equal to $-4.5(-e+1/3)$ when $e$ is greater than 1/3. The current $i'_4$ is equal to zero zero when $e$ is greater than $-1/3$ and said current is equal to $-4.5(-e-1/3)$ when $e$ is less than or equal to $-1/3$.

The current supplied to the input of the first output amplifier 172 is equal to $i'_1+i'_3$, which is equal to $3e-2$. when $e$ is greater than 1/3. The current supplied to the input of the first output amplifier 172 is equal to $$i'_1+i'_{2'}$$

which is equal to $-3e$, when $e$ is less than or equal to 1/3 and is greater than $-1/3$. The current supplied to the input of the first output amplifier 172 is equal to $i'_{2'}+i_{24}$, which is equal to $3e+2$, when $e$ is less than or equal to $-1/3$. The current supplied to the input of the second output amplifier 173 is thus equal to the negative of the current supplied to the input of the first output amplifier 172.

Each of the first and second output amplifiers 172 and 173 inverts the polarity of its input signal, so that the output signal provided by dividing the input signal supplied to the first input terminal 101 in accordance with the dividing, quotient or input-output characteristic of part A of FIG. 5, and then amplifying such signal three times, is provided at the first output terminal 103 and an output signal of the opposite polarity is provided at the second output terminal 104. The output signals at the first and second output terminals 103 and 104 are supplied to the next succeeding stage of the trinary code conversion system of the present invention. The comparator 176 determines the polarities of the output signals of the third and fourth amplifiers 118 and 124 and may comprise any suitable comparator circuit.

If the output signal of the third amplifier 118 is indicated as 0177 and is of positive polarity, it has a value of 1. When the output signal 0177 is negative, it has a value of 0. If the output of the fourth amplifier 124 is indicated as 0178 and is of positive polarity, it has a value of 1. When the signal 0178 is of negative polarity, it has a value of 0. The relation between the signals 0177 and 0178 and the trinary code signals provided at the output terminal 179 of the comparator 176 is as follows. When the input signal $e$ has an amplitude which is greater than 1/3, the output signal 0177 is +1, the output signal 0178 is +1 and the trinary code signal at the output terminal 179 is +1. When the input signal $e$ has an amplitude which is less than or equal to 1/3 and greater than $-1/3$, the output signal 0177 is 0, the output signal 0178 is +1 and the trinary code output signal at the terminal 179 is 0. When the input signal $e$ has an amplitude which is less than or equal to $-1/3$, the output signal 0177 is 0, the output signal 0178 is 0 and the signal at the output terminal 179 is $-1$.

FIG. 12 is a code converter for converting the trinary code provided by the comparator 176 of FIG. 10. The circuit of FIG. 12 may be included in the comparator 176 of FIG. 10. The signals indicating the polarities of the output signals 0177 and 0178 of the third and fourth amplifiers 118 and 124 of FIG. 10 are supplied to input terminals 191 and 192, respectively, of FIG. 12. If one of these signals is of positive polarity, it has a magnitude of +1. The anode of a first diode 193 is connected to the first input terminal 191 and the anode of a second diode 194 is connected to the second input terminal 192. The cathodes of the diodes 193 and 194 are connected in common to a common point between the cathode of a fourth diode 195 and the anode of a fifth diode 196 via leads 197, 198 and 199.

The common output of the first and second diodes 193 and 194 is applied to the base electrode of a first transistor 201 via the third diode 195. The base electrode of the transistor 201 is connected to the anode of the third diode 195 via leads 202 and 203. The common output of the first and second diodes 193 and 194 is connected to the base electrode of a second transistor 204 via the fourth diode 196. The base electrode of the second transistor 204 is connected to the cathode of the fourth diode 196 via leads 205 and 206. The first transistor 201 is an NPN type transistor and the second transistor 204 is a PNP type transistor. The emitter electrodes of the first and second transistors are connected to each other via a common connecting lead 207 to which an output terminal 208 is connected via a lead 209.

A positive voltage source is connected to a terminal 211 and a negative voltage source is connected to a terminal 212. The postitive voltage at the terminal 211 is applied to the collector electrode of the first transistor 201 via a lead 213 and to the base electrode of said transistor via a resistor 214 and leads 215 and 203. The negative voltage at the terminal 212 is applied to the collector electrode of the second transistor 204 via a lead 216 and to the base electrode of said transistor via a resistor 217 and leads 218 and 206. The resistors 214 and 217 provide the desired operating points for the first and second transistors 201 and 204, respectively. The third and fourth diodes 195 and 196 function to shift the DC voltage.

The first and second diodes 193 and 194, respectively, function together as an AND circuit. The trinary code output signals provided at the output terminal 208 are those which are provided at the output terminal 179 of the comparator 176 of FIG. 10, since when the circuit of FIG. 12 is utilized in said comparator, the output terminal 208 is the output terminal 179. The resistance values of the resistors 214 and 217 are so determined that the output signal at the output terminal 208 is of positive polarity when the input signals to the first and second input terminals 191 and 192 are both positive. The output signal at the output terminal 208 is 0 when a signal of positive polarity is supplied to only one of the first and second input terminals 191 and 192 and is of negative polarity when there is no signal supplied to either of said first and second input terminals.

The trinary code conversion system of FIG. 10 function to provide the dividing, amplifying and comparing of the operations simultaneously as a balanced circuit. The influence of noise is considerably reduced in the circuit of FIG. 10 and there is no need for delay circuits since time delays between balanced input and output terminals of code position stages are uniform.

Although in the embodiment of FIG. 10 the two input signals supplied to the first and second input terminals 101 and 102 must be of opposite polarities, an amplifier having a gain of one may be utilized to invert the polarity. Furthermore, a delay circuit may be utilized which has a delay equal in duration to the delay encountered by the signal in passing through the amplifier. Equal signals may then be supplied to the inputs of both the amplifier and the delay circuit. Output signals of equal absolute amplitude and of opposite polarities may then be provided.

In the multinary code conversion system of the present invention, the number of stages utilized foor the division of the amplitude may be decreased to a number less than the number of stages required in a binary encoder. This provides the advantages of high speed and high precision in operation as well as inexpensiveness oof manufacture, due to simplification of structure. Furthermore, where frequency division multiple signals are utilized having an amplitude distribution near the normal distribution, the probability that the first place or digit of the trinary output code signal will be 0 is approximately 68%, so that said signals may be utilized for synchronization.

The multinary code provided by the code conversion system of the present invention may, of course, be converted into another code for the purpose of transmission.

While the invention has been described by means of specific examples and in a specific embodiment, we do not wish to be limited thereto, for obvious modifications will occur to those skilled in the art without departing from the spirit and scope of the invention.

We claim:

1. A code conversion system for converting analog input signals to trinary code output signals, said code conversion system comprising a plurality of stages, each of said stages comprising a pair of input means for supplying analog input signals having the same absolute amplitude but opposite polarities;

first, second, third and fourth summing resistors;

a first amplifier connected to one of said input means via the first summing resistor, said first amplifier having an input, an output and first and fifth feedback loops;

a second amplifier connected to said one of said input means via the second summing resistor, said second amplifier having an input, an output and second and sixth feedback loops;

a third amplifier connected to the other of said input means via the third summing resistor, said third amplifier having an input, an output and third and seventh feedback loops;

a fourth amplifier connected to said other of said input means via the fourth summing resistor, said fourth amplifier having an input, an output and fourth and eighth feedback loops, each of said first, second, third and fourth feedback loops passing the positive output signals of the corresponding amplifier to the input thereof and each of the fifth, sixth, seventh and eighth feedback loops passing the negative output signals of the corresponding amplifier to the input thereof;

fifth, sixth, seventh and eighth summing resistors;

first battery means connected to said first amplifier via the fifth summing resistor and connected to said third amplifier via the seventh summing resistor for supplying bias current to said first and third amplifiers;

second battery means connected to said second amplifier via the sixth summing resistor and connected to said fourth amplifier via said eighth summing resistor for supplying bias current to said second and fourth amplifiers;

a first output amplifier connected to said second, third, fifth and eighth feedback loops and having an output connected to the input of the next succeeding one of said plurality of stages if the stage of said first output amplifier is other than the last of said plurality of stages;

a second output amplifier connected to the first, fourth, sixth and seventh feedback loops and having an output connected to the input of the next succeeding one of said plurality of stages if the stage of said second output amplifier is other than the last of said plurality of stages; and comparator means connected to the outputs of said third and fourth amplifiers for providing a trinary code, said comparator means including a code converter.

2. A code conversion system as claimed in claim 1, further comprising an AND gate comprising first and second diodes connected to the outputs of said third and fourth amplifiers, third and fourth diodes, an NPN transistor having an emitter electrode and a base electrode connected to said AND gate via said third diode, a PNP transistor having a base electrode connected to said AND gate via said fourth diode and an emitter electrode connected to the emitter electrode of said NPN transistor, and an output connected in common to the emitter electrodes of said NPN and PNP transistors.

3. A code conversion system as claimed in claim 1, wherein said first feedback loop includes a first resistor and a first diode, said second feedback loop includes a second resistor and a second diode, said third feedback loop includes a third resistor and a third diode, said fourth feedback loop includes a fourth resistor and a fourth diode, said fifth feedback loop includes a fifth resistor and a fifth diode, said sixth feedback loop includes a sixth resistor and a sixth diode, said seventh feedback loop includes a seventh resistor and a seventh diode and said eighth feedback loop includes an eighth resistor and an eighth diode.

4. A code conversion system as claimed in claim 3, wherein said analog input signals have an amplitude range of +1 to −1, said first battery means supplies a positive voltage of +1, said second battery means supplies a relative negative voltage, said positive and negative voltages having a range equivalent to said amplitude range, each of said first, second, third and fourth summing resistors has a predetermined resistance which is equal to that of each of the others, each of said fifth, sixth, seventh and eighth summing resistors has a predetermined resistance which is equal to that of the others and which is three times that of each of said first, second, third and fourth summing resistors, each of said second, fourth, fifth and seventh feedback resistors has a predetermined resistance equal to that of the others and 1.5 times greater than that of each of said first, second, third and fourth summing resistors, and each of said first, third, sixth and eighth feedback resistors has a predetermined resistance equal to that of the others and 4.5 times greater than that of each of the first, second, third and fourth summing resistors.

References Cited

UNITED STATES PATENTS

| | | | |
|---|---|---|---|
| 3,467,958 | 9/1969 | McKinney | 340—347 |
| 2,969,535 | 1/1961 | Foulkes | 340—347 |
| 3,187,325 | 6/1965 | Waldhauer | 340—347 |
| 3,246,314 | 4/1966 | Kaenel | 340—347 |
| 3,329,950 | 7/1967 | Shafer | 340—347 |

MAYNARD R. WILBUR, Primary Examiner

M. K. WOLENSKY, Assistant Examiner